Sheet 1 - 4 Sheets.

J. W. Mulley.

Mower.

No. 1499

Reissued Jun. 16, 1863.

Witnesses.
W. Lawfox
Wm. M. Rawlins

Inventor
J. W. Mulley
by
A. Pollock his atty

J. W. Mulley.
Mower.

No 1499 Reissued Jun. 16, 1863.

Witnesses.

W. Fairfax

Wm M. Rawlins

Inventor.

J. W. Mulley by

A. Pollock his atty

Sheet 3 - 4 Sheets
J. W. Mulley.
Mower.
No 1499 Fig. 3. Reissued Jun. 16, 1863.
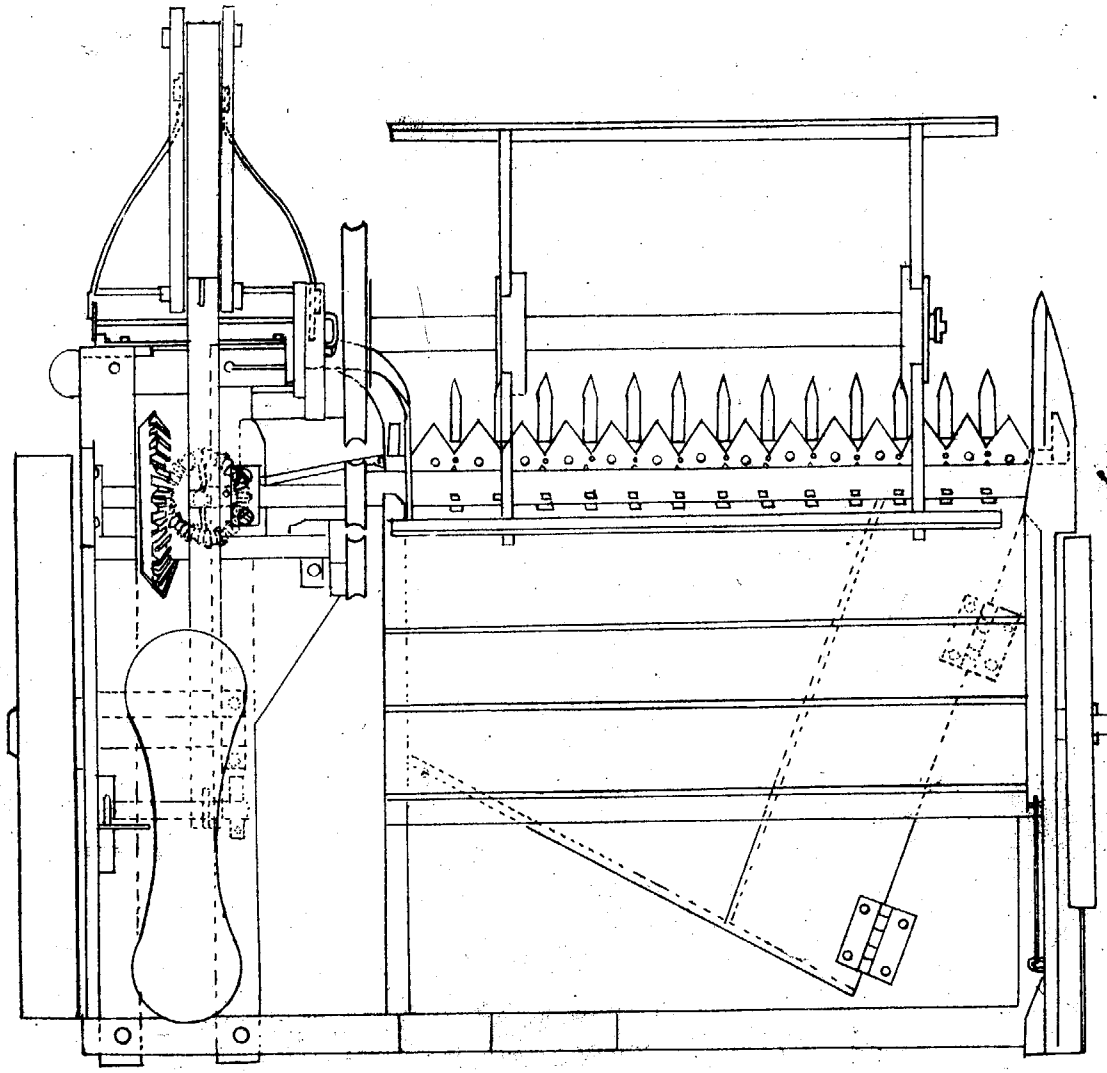
Witnesses.
W. Fairfax
Wm. M. Rawlins
Inventor.
J. W. Mulley
by A. Pollock his atty Sheet 4 - 4 Sheets.
J. W. Mulley.
Mower.
No. 1499 Reissued Jun. 16, 1863.
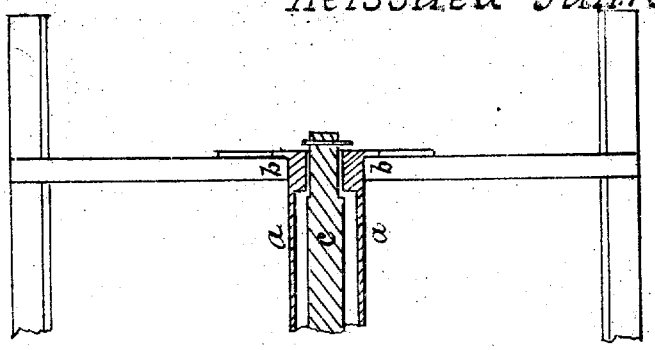
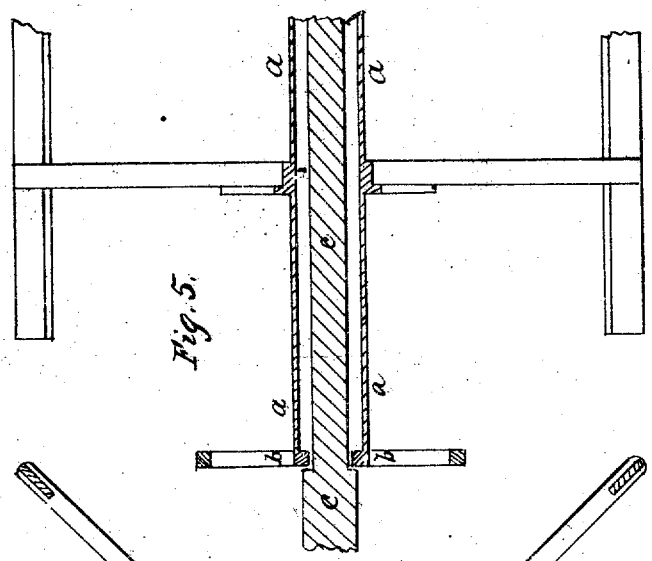
Fig. 5.
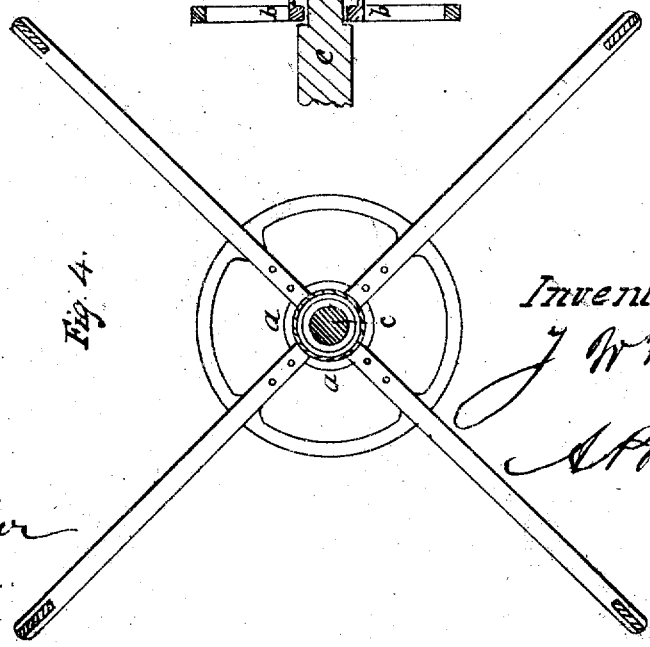
Fig. 4.
Witnesses.
A. F. Faber
W. Fairfax.
Inventor
J. W. Mulley
by
A. Pollak
his atty

UNITED STATES PATENT OFFICE.

DAVID M. OSBORNE AND WM. A. KIRBY, OF AUBURN, NEW YORK, ASSIGNEES, BY MESNE ASSIGNMENTS, OF JEREMIAH W. MULLEY.

IMPROVEMENT IN REAPING AND MOWING MACHINES.

Specification forming part of Letters Patent No. 16,599, dated February 10, 1857; Reissue No. 860, dated November 29, 1859; Reissue No. 1,499, dated June 16, 1863.

*To all whom it may concern:*

Be it known that JEREMIAH W. MULLEY, of Amsterdam, in the county of Montgomery and State of New York, did invent certain new and useful Improvements in Reaping and Mowing Machines; and we do hereby declare that the following is a full, clear, and exact description of the same, reference being had to the accompanying drawings, making a part of this specification, in which—

Figure 1:
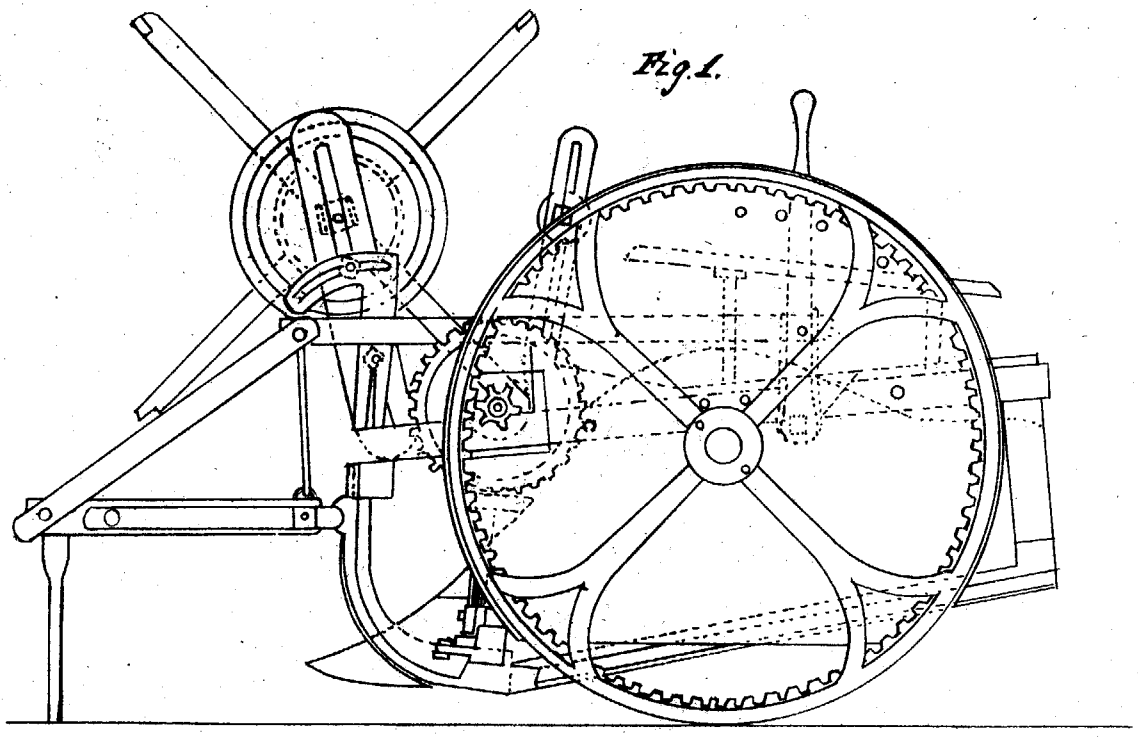
Figure 2:
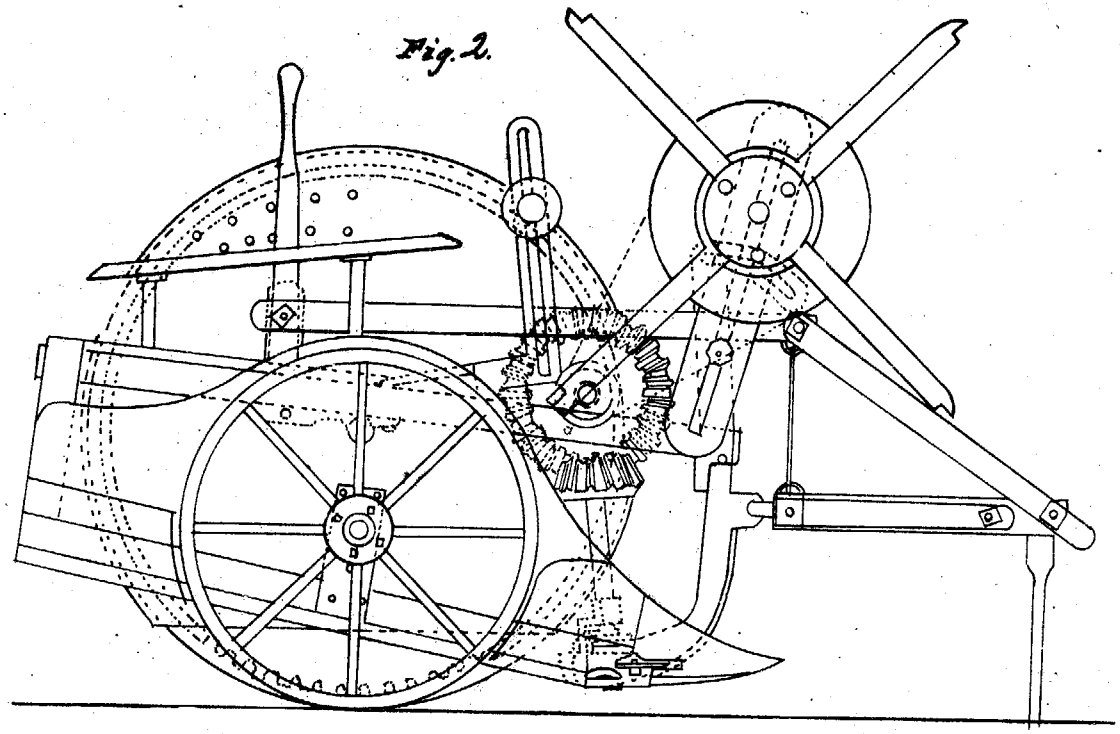

Figures 1, 2, and 3 represent views, in elevation and plan, of a harvesting-machine with the improvements in question applied to it; and Figs. 4 and 5 represent longitudinal and transverse sections of a harvester-reel constructed according to his improvement.

This improvement relates to the mode of hanging the reel, and we shall therefore not minutely refer to the other portions of the machine further than to illustrate the action of the reel therewith, the machine being shown in the drawings; nor shall we describe the general action and use of a reel, as these are well understood.

The nature of this invention consists, first, in hanging and supporting the reel in or on a single reel-post located at or near the main-frame end of the cutting apparatus, and so adjustably united therewith as that the reel may be raised up or let down or set more toward or from the standing grain or grass, as may be found necessary.

In the accompanying drawings, the reel A is represented as occupying its ordinary general position on the machine. It may be rotated by belt, or in any other suitable manner, and be of any desired length and diameter; also of any appropriate general construction, subject to the improvements hereinafter named.

B is a reel-post for supporting the reel. This reel-post is located on the draft side of the machine, and so that it may be raised or lowered and be set forward or back to give the desired adjustability to the reel. This may be done by securing said reel-post to an adjusting-plate or slotted hook-piece, *a*, the reel-post being also slotted, as at *b*; or it may be done in any other suitable manner; but it is necessary that the support given to the reel should be a firm one, as it is sustained only on the one reel-post B; otherwise the reel would sag by reason of its being unsupported at its opposite end. By such construction and mode of hanging, not only great facility of adjustment is obtained, but a clear, open space given to the reel so far as an obstructing support at its outer end next the standing grain is concerned, and a ready unshipment of the reel when it is not required on the machine.

The reel-shaft C is supported at distant points *c c* in its lengths by bearings *d d*, which are affixed to the reel-post and give it its necessary rigidity. These bearings are represented as united by a tube through which the reel-shaft passes.

Having thus fully described this invention, what we claim as the invention of JEREMIAH W. MULLEY is—

In combination with a reel supported on a single reel-post, an adjusting mechanism by which the reel may be raised up or let down upon the post, and the reel and post leaned more toward or from the standing grain or grass, as the condition of the crop may require, and substantially as herein described.

DAVID M. OSBORNE.
WM. A. KIRBY.

Witnesses:
O. H. BURDICK,
JOHN H. OSBORNE.